uscode

United States Patent
Singh

(12) United States Patent
(10) Patent No.: US 11,586,806 B1
(45) Date of Patent: Feb. 21, 2023

(54) DISTRIBUTED ELECTRONIC SIGNATURE PROCESSING

(71) Applicant: Citrix Systems, Inc., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 0 days.

(21) Appl. No.: 17/363,928

(22) Filed: Jun. 30, 2021

(51) Int. Cl.
| | | |
|---|---|---|
| G06F 17/10 | (2006.01) |
| G06F 40/171 | (2020.01) |
| G06F 16/955 | (2019.01) |
| G06F 40/143 | (2020.01) |
| G06K 7/14 | (2006.01) |
| G06F 3/04883 | (2022.01) |
| G06F 3/04842 | (2022.01) |

(52) U.S. Cl.
CPC ........ G06F 40/171 (2020.01); G06F 3/04883 (2013.01); G06F 16/9566 (2019.01); G06F 40/143 (2020.01); G06K 7/1417 (2013.01); G06F 3/04842 (2013.01)

(58) Field of Classification Search
CPC .. G06F 40/171; G06F 40/143; G06F 16/9566; G06F 3/04883; G06F 3/04842; G06K 7/1417
See application file for complete search history.

(56) References Cited

U.S. PATENT DOCUMENTS

| | | | | |
|---|---|---|---|---|
| 8,145,909 B1* | 3/2012 | Agrawal | ............... | H04L 9/3247 |
| | | | | 713/180 |
| 8,468,610 B2* | 6/2013 | Beals | ............... | H04N 21/25816 |
| | | | | 726/34 |
| 8,601,367 B1* | 12/2013 | Ritz | ........................ | G06Q 40/00 |
| | | | | 715/234 |
| 8,667,290 B2* | 3/2014 | Appelbaum | ........... | G06Q 40/08 |
| | | | | 713/176 |
| 9,286,281 B2* | 3/2016 | Dunn | .................... | G06F 40/143 |
| 9,436,668 B2 | 9/2016 | Dunn et al. | | |
| 9,507,760 B2 | 11/2016 | Dunn et al. | | |
| 9,594,739 B2 | 3/2017 | Dunn et al. | | |
| 10,546,053 B2 | 1/2020 | Dunn | | |
| 2002/0104884 A1* | 8/2002 | Meier | ................ | G06K 7/10792 |
| | | | | 235/462.25 |
| 2004/0059809 A1* | 3/2004 | Benedikt | ............... | G06F 16/951 |
| | | | | 709/224 |
| 2004/0190772 A1* | 9/2004 | Constantin | ............. | G06V 10/22 |
| | | | | 382/175 |
| 2006/0159313 A1* | 7/2006 | Hicks | ...................... | G06F 9/451 |
| | | | | 382/119 |
| 2007/0188823 A1* | 8/2007 | Koide | .................... | G06V 10/22 |
| | | | | 358/448 |

(Continued)

FOREIGN PATENT DOCUMENTS

EP          2866157          4/2015

*Primary Examiner* — Shahid K Khan

(57) ABSTRACT

A technique for distributed electronic signature processing includes displaying a document for signature on a first device along with an optically-readable code. A second device scans the optically-readable code displayed by the first device, initiating a process that transfers signature entry from the first device to the second device, which may receive handwritten signatures input or otherwise provided thereon. The second device then accepts the physical signature, which is used to effectuate a signing of the document.

22 Claims, 10 Drawing Sheets

(56) References Cited

U.S. PATENT DOCUMENTS

| | | | | |
|---|---|---|---|---|
| 2008/0307298 A1* | 12/2008 | Matveief | ............... | G06F 40/174 |
| | | | | 715/224 |
| 2010/0100743 A1* | 4/2010 | Ali | ...................... | H04L 63/0457 |
| | | | | 713/176 |
| 2011/0093769 A1* | 4/2011 | Dunn | .................... | G06F 40/174 |
| | | | | 715/221 |
| 2012/0284602 A1* | 11/2012 | Seed | .................. | G06Q 20/3274 |
| | | | | 715/224 |
| 2013/0185210 A1* | 7/2013 | Dodson | .................. | G06Q 20/40 |
| | | | | 705/44 |
| 2013/0246914 A1* | 9/2013 | Millefiorini | ............. | G06F 16/93 |
| | | | | 715/268 |
| 2014/0181256 A1* | 6/2014 | Trifa | ...................... | H04L 67/54 |
| | | | | 709/218 |
| 2014/0221795 A1* | 8/2014 | Yeager | ................... | G16H 40/67 |
| | | | | 600/323 |
| 2015/0178252 A1* | 6/2015 | Dunn | .................... | G06F 40/143 |
| | | | | 715/234 |
| 2015/0317643 A1 | 11/2015 | Mian et al. | | |
| 2015/0334339 A1* | 11/2015 | Dejene | ..................... | H04N 5/76 |
| | | | | 705/309 |
| 2015/0358400 A1 | 12/2015 | Bartlett, II et al. | | |
| 2016/0335479 A1* | 11/2016 | Bartlett, II | ............ | H04L 67/146 |
| 2017/0345394 A1 | 11/2017 | Bansal et al. | | |
| 2019/0370528 A1* | 12/2019 | Cernautan | .......... | H04N 5/23212 |
| 2020/0258176 A1* | 8/2020 | Gibson | ................ | G06Q 10/083 |
| 2020/0364323 A1* | 11/2020 | Bendersky | ....... | G06K 19/06037 |
| 2021/0319517 A1* | 10/2021 | Aringdale | ............ | G06F 3/0482 |

\* cited by examiner

DISTRIBUTED ELECTRONIC SIGNATURE PROCESSING

BACKGROUND

Electronic documents are quickly becoming the first choice of many businesses and other entities, which prefer them for their speed of execution, paperless processing, and added convenience. In a typical scenario, a user prepares a document for electronic signature. The user uploads the document to a document server and specifies one or more parties as signatories to the document, e.g., by providing their email addresses or cell phone numbers. The user may add one or more fields for data entry, and such fields may include one or more signature fields.

Once all the fields have been placed into the document, the user may submit the document for online execution. For example, the document server responds to the user's submission by sending an email or other communication to each specified party. The email or other communication may include a brief description of the document and a link to a version of the document prepared for the respective party's signature. A party clicks on the link, and a version of the document opens, e.g., in a browser or app on the party's computer or other device. The party can then review the agreement, enter any requested data into fields prepared for this purpose, and sign the document. The party may then submit the signed document, e.g., by clicking or tapping a button. Submitting the document returns the signed document to the document server, which may store the signed document for safekeeping. The document server may also merge the input from multiple parties to create an aggregate document, which includes all inputs and signatures of all parties.

SUMMARY

Unfortunately, available options for receiving signatures into electronic documents are not always ideal. Many times, parties merely type their names into signature fields, resulting in signatures that look computer-generated. Although such signatures may be legally binding, they may not appear as official and proper as hand-written signatures. They may also bear little resemblance to the parties' handwritten signatures.

Some service providers allow parties to enter their signatures by hand. This can be effective if the signing party's computer uses a pointer device that allows for neat handwriting, such as a touchscreen, touchpad, stylus, or the like. But if the party's device uses a mouse, joystick, trackball, or the like, then the party's signature will often come out looking messy. The party may try many times before producing an acceptable result. What is needed is a more convenient way for parties to enter hand-written electronic signatures, regardless of the type of pointer device provided by the computers or other devices they are using.

To address the above-described need at least in part, an improved technique is provided for distributed electronic signature processing. The technique includes displaying a document for signature on a first device along with an optically-readable code. A second device scans the optically-readable code displayed by the first device, initiating a process that transfers signature entry from the first device to the second device, which may receive handwritten signatures input or otherwise provided thereon. The second device then accepts the physical signature, which is used to effectuate a signing of the document.

Advantageously, the signing of the document is transferred from the first device, which may lack a pointer device that easily allows for neat handwriting, to the second device, which may include a pointer device that allows for neat handwriting, such as a touchscreen, touchpad, stylus, or the like. A party is then able to sign the document neatly, producing a good result quickly, usually without having to make multiple attempts.

Certain embodiments are directed to a first method that includes scanning, by a second device, an optically-readable code displayed by a first device that presents a document for signature. The first method further includes receiving, by the second device responsive to scanning of the optically-readable code, a webpage that includes a signature-entry field. In response to the second device receiving a physical signature, the first method still further includes entering the physical signature into the document to sign the document.

In some embodiments, the optically-readable code includes a URL (uniform resource locator) of the webpage that includes the signature-entry field, and receiving the webpage includes downloading, by the second device, the webpage from a location specified by the URL.

In some embodiments, the first method further includes generating, by the second device, signature data that represents a manual input of the signature and transferring, by the second device, the signature data to the first device to enable the first device to incorporate the signature into the document based on the signature data received from the second device.

In some embodiments, the first method further includes generating, by the second device, signature data that represents a manual input of the signature and transferring, by the second device, the signature data to a server.

In some embodiments, the URL provides a location of the document, and receiving the webpage includes downloading, by the second device, the document from the location specified by the URL.

In some embodiments, entering the physical signature into the document includes entering the signature into the document on the second device.

In some embodiments, the optically-readable code is a QR (quick response) code.

In some embodiments, the first method further includes the second device receiving the physical signature via a touchscreen.

Further embodiments are directed to a second method that includes displaying, by a first device, a document for signature and an optically-readable code, the optically-readable code providing a location of a webpage that includes a signature field associated with the document. The second method further includes receiving, by the first device, signature data that represents a physical signature entered into the signature field of the webpage on a second device and incorporating, by the first device, the signature data into the document based on the signature data received from the second device.

In some embodiments, displaying the optically-readable code is responsive to detecting, by the first device, a user-selection of a signature field of the document.

In some embodiments, the second method further includes, prior to detecting the user-selection of the signature field, identifying entry of user input into a non-signature field of the document and selectively providing, responsive to the identification, the optically-readable code as one or (i) a URL of a webpage that includes a signature-entry field but not the document itself or (ii) a URL of the document.

In some embodiments, displaying the optically-readable code includes rendering the optically-readable code within at least one of (i) a window that displays the document and (ii) a window separate from the document.

In some embodiments, displaying the document for signature includes rendering the document within a second webpage, and displaying the optically-readable code includes rendering the optically-readable code within an HTML element of the second webpage.

Still further embodiments are directed to a third method that includes transmitting, by a server, a document for signature and an optically-readable code to a first device of a user, the optically-readable code configured to provide a location of a webpage that includes a signature-entry field associated with the document. In response to the server receiving, from a second device of the user, a request to download the webpage, the third method further includes sending the webpage to the second device, the webpage enabling entry of a physical signature of the user into the signature-entry field associated with the document.

In some embodiments, transmitting the document and the optically-readable code to the first device includes incorporating the optically-readable code into the document prior to transmitting the document to the first device.

In some embodiments, transmitting the document and the optically-readable code to the first device includes sending the document to the first device without the optically-readable code and, in response the server receiving an indication from the first device that an event has occurred, sending the optically-readable code to the first device.

In some embodiments, the third method further includes generating the webpage as one that includes the signature-entry field associated with the document but not the document itself, and generating a URL (uniform resource locator) that identifies the webpage.

In some embodiments, the optically-readable code provides a URL of the document.

In some embodiments, the third method further includes, prior to transmitting the document to be signed to the first device, receiving the document from a document-signing service, determining whether the document includes a signature field, and, responsive to the determination, inserting into the document one of (i) the optically-readable code and (ii) a placeholder for later receiving the optically-readable code.

In some embodiments, transmitting the optically-readable code to the first device includes providing the optically-readable code for incorporation into the document at the placeholder.

Other embodiments are directed to computerized apparatus constructed and arranged to perform any of the methods described above. Still other embodiments are directed to one or more computer program products. Each computer program product stores instructions which, when executed by control circuitry of a computerized apparatus, cause the computerized apparatus to perform any of the methods described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique is provided for distributed electronic signature processing. The technique includes displaying a document for signature on a first device along with an optically-readable code. A second device scans the optically-readable code displayed by the first device, initiating a process that transfers signature entry from the first device to the second device, which may receive handwritten signatures input or otherwise provided thereon. The second device then accepts the physical signature, which is used to effectuate a signing of the document.

Figure 1:
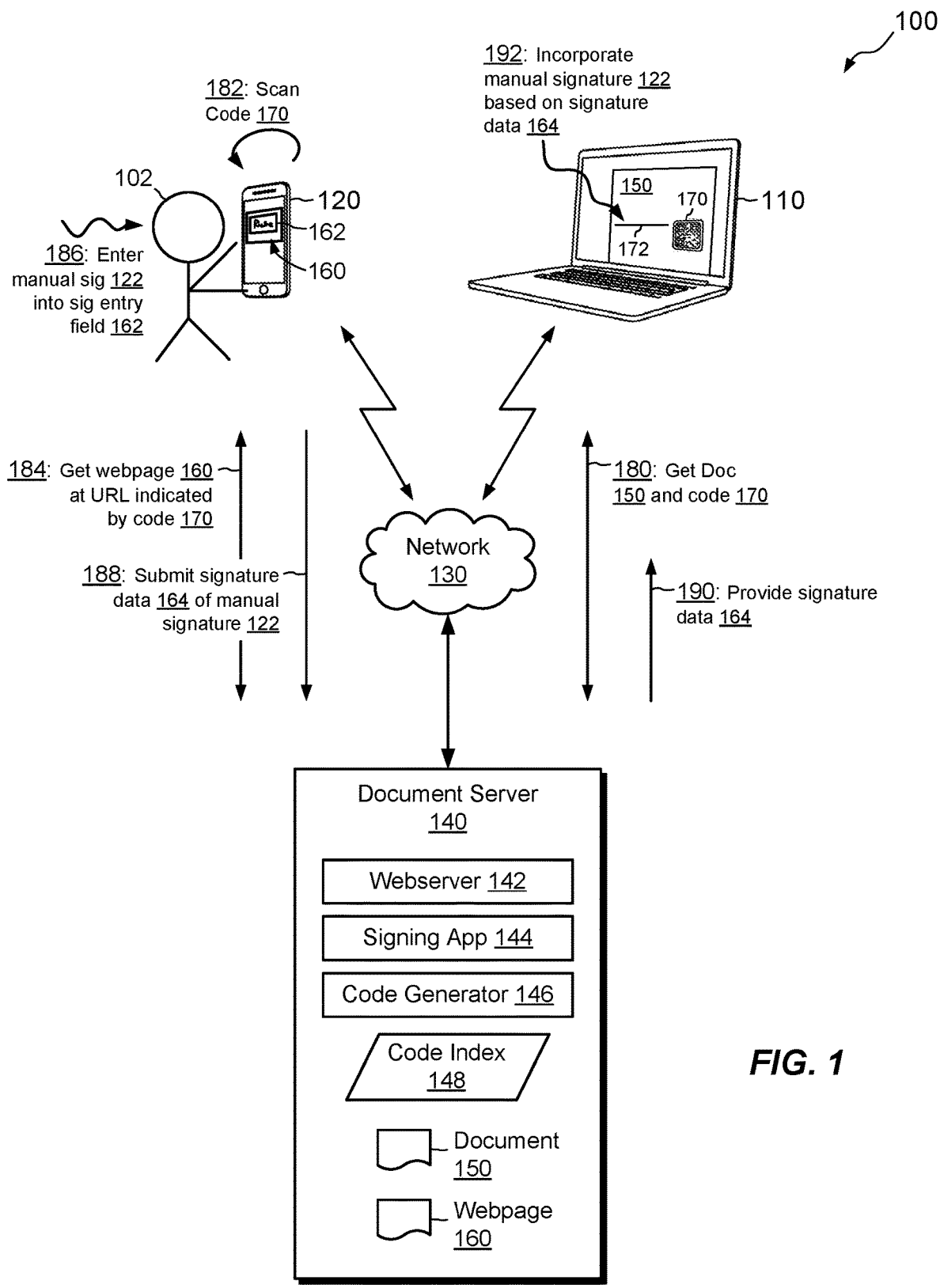
FIG. 1 is a block diagram of an example environment in which embodiments of the improved technique can be practiced.

FIG. 1 shows an example environment 100 in which embodiments of the improved technique can be practiced. The environment 100 includes a first device 110, a second device 120, a network 130, and a document server 140. The first device 110, second device 120, and document server 140 may be any type or types of computing device capable of running software and connecting to the network 130. Devices 110 and 120 and server 140 each include one or more communication interfaces, one or more processors, and memory. The respective processors and memory form respective control circuitry, which is constructed and arranged to carry out various methods and functions as described herein.

In an example, the first device 110 does not have a pointer device that easily allows for neat handwriting. For example, the first device 110 may have only a mouse, a trackball, a joystick or the like. Indeed, the first device 110 need not have any pointer device at all. By contrast, the second device 120 has a pointer device that easily allows for neat handwriting, such as a touchscreen, touchpad, stylus, or the like. In the particular example shown, the first device 110 is a laptop computer with no touchscreen or touchpad and the second device 120 is a smartphone with a touchscreen. This example is merely for illustration and should not be construed as limiting, however.

The network 130 may be any type of network or combination of networks, such as a local area network (LAN), a wide area network (WAN), the Internet, and/or some other type of network or combination of networks. In an example, the first device 110 and the second device 120 are both connected (e.g., wirelessly or via wired connections) to the Internet via a router. The document server 140 may also be connected to the network 130, e.g., via a separate LAN or by any other means. A wide variety of network arrangements may be used, the particulars of which are not critical to this disclosure.

As further shown, the document server 140 includes a webserver 142, a signing application 144, a code generator 146, and a code index 148. The webserver 142 is configured to enable clients, such as devices 110 and 120, to access webpages from the document server 140 and to perform various functions. The webserver 142 is further configured to host or otherwise provide access to the signing app 144, which provides document-signing capabilities. Code generator 146 is configured to generate optically-readable codes. Such codes may specify various content, such as URLs (uniform resource locators) of webpages, identifiers, and/or other information. The optically-readable codes may typically be provided as barcodes, QR (quick-response) codes, and/or other types of codes that may be displayed on screens of computing devices and read by digital cameras. Code index 148 is configured to store associations between optically-readable codes and respective documents, parties, and/or other information. Although the document server 140 is shown as a single computer, one should appreciate that the document server 140 may be realized using one or more virtual machines and/or any number of physical computers, which are configured to work together in achieving the functions and methods described herein.

In example operation, a user 102 of the first device 110 initiates execution of a document 150. For example, the first device 110 receives an email message, a text message, or some other communication, which includes a link to download and sign the document 150. As an example, the document 150 may previously have been created and stored on the document server 140 and the user 102 may previously have been specified as a party to the document 150. The document 150 may be prepared for signature by any number of parties and may include one or more signature fields for each of such parties.

FIG. 1 shows an example signing process by the user 102, as illustrated by operations 180, 182, 184, 186, 188, and 190. In an example, operation 180 begins when the user 102 clicks or otherwise activates a link on the first device 110 from the email, text message, or the like. During this operation 180, the first device 110 requests and obtains the document 150 and an associated code 170 from the document server 140. For example, activating the link causes the first device 110 to open a browser or other application that sends a request for the document 150 to the document server 140. In response to receiving the request, the signing app 144 identifies the user 102 and the document 150 and proceeds to generate a new webpage 160 that includes a signature-entry field 162 associated with that user and document. The new webpage 160 may be a simple page containing a single data-entry field, i.e., one that provides an area for receiving a manually-entered signature, and a submit button or other control to submit the entered signature. The new webpage 160 may include any number of fields, however.

The document server 140 may store the new webpage 160 at a location having a specified URL, and the code generator 146 may encode the specified URL into the optically-readable code 170. In an example, the signing app 144 incorporates the optically-readable code 170 into the document 150, e.g., by placing the code 170 within the document 150 adjacent to a first signature field 172 designated for the user 102. The webserver 142 then sends the document 150 containing the code 170 back to the first device 110.

In some examples, the document server 140 may generate the webpage 160 and the code 170 prior to the user 102 accessing the document 150, such as when the document 150 is first created on the document server 140. Different respective webpages 160 and codes 170 may be generated for respective parties to the document 150. The codes 170 may be incorporated into respective versions of the document 150, which may be provided to the respective parties when those parties request the document. One should appreciate, though, that webpages 160 and codes 170 may be provided in any suitable and convenient manner, with the examples above being described merely for illustration.

Upon completion of operation 180, the first device 110 displays the document 150 together with the code 170. For example, a browser or other application running on the first device 110 renders the document 150 in a webpage, e.g., within one or more HTML (HyperText Markup Language) canvas elements of the webpage. In an example, the first device 110 displays the document 150 such that the code 170 appears adjacent to the signature field 172 (as shown).

As an alternative to sending the code 170 within the document 150, the webserver 142 may instead send the document 150 and the code 170 separately, e.g., in respective pages. For example, the webserver 142 may send the document 150 in a first page, e.g., for display by the first device 110 in a first browser window, and may send the code 170 in a second page, e.g., for display by the first device 110 in a second browser window, such as a pop-up window. The first device 110 may then display both windows.

One should appreciate that the document 150 may include additional data-entry fields that are not signature-entry fields, such as fields for receiving the user's name, address, phone number, etc. The user 102 may typically enter any requested data into such fields before signing. The user 102 may then have the option to sign by typing his or her signature into the field 172, or the user may struggle to use a mouse or other pointer device for this purpose.

Code 170 provides the user 102 with an additional option, however, i.e., the option to use another device for entering a manual electronic signature into the document 150. As shown in operation 182 (top-left), the user 102 may operate the second device 120 to scan the code 170 displayed by the first device 110, e.g., by using a camera of the second device 120 to take a photo of the code 170. In an example, the second device 120 includes a code reader (e.g., a QR-code reader), which responds to a photo of the code 170 by converting the code into corresponding text. In this example, the converted code includes the text of the above-described URL, which provides the location of the webpage 160.

At operation 184, the second device 120 requests and obtains the webpage 160, i.e., from the location specified by the URL indicated by the code 170. For example, the second device 120 contacts the signing app 144 via the webserver 142. The signing app 144 checks the code index 148 and identifies the webpage 160 associated with the code 170 and the user 102 (e.g., from among multiple webpages listed for various documents and parties). The webserver 142 then obtains the identified webpage 160 and returns it to the second device 120. A browser or app running on the second device 120 then displays the webpage 160, which includes the signature-entry field 162 for the user 102.

At operation 186, the user 102 enters a manual signature 122 into the signature-entry field 162 of the webpage 160. For example, the user 102 uses a finger or stylus to freehand-draw a signature into the signature-entry field 162. As the user 102 enters the manual signature 122, the second device 120 records signature data 164 that represents entry of the manual signature 122. For example, the signature data 164 includes samples of screen coordinates touched by the finger or stylus. It may further include times when each coordinate location is touched. In an example, the signature data 164 is sufficient to enable a facsimile of the manually-entered signature to be replayed or otherwise reproduced elsewhere.

At operation 188, the user 102 submits the entered signature 122, e.g., by tapping a button or link (not shown) on the webpage 160. In an example, submitting the signature 122 has the effect of sending the signature data 164 to the signing app 144 of the document server 140.

At operation 190, the document server 140 sends the signature data 164 to the first device 110. The first device 110 then receives the signature data 164.

At operation 192, the first device 110 incorporates the manual signature 122 into the document 150 based on the signature data 164. For example, the first device 110 replays or otherwise renders the signature data 164 within the signature field 172 of the document 150, so that the same signature 122 that the user 102 entered into the second device 120 is entered into the signature field 172 of the first device 110. If the document 150 includes any additional signature fields for the user 102, the user 102 may page down to such fields and enter his or her signature again. In an example, the code 170 is associated with only the first signature field and the user 102 may enter additional signatures merely by clicking or tapping, i.e., without having to obtain a new manual signature 122 for each additional signature-entry field.

In an example, the browser or application that displays the document 150 on the first device 110 is capable of executing instructions for incorporating the signature data 164 into the signature field 172 and of performing other functions related to executing the document 150. In one example, the first device 110 obtains such instructions as JavaScript or other scripted code along with the document 150 during operation 180. As another example, a browser on the first device 110 is specially configured for document execution. For example, the browser includes a plug-in or add-in for this purpose. In cases where the first device 110 includes a separate application for document execution, the application may include instructions needed for performing the above functions, such as compiled code generated from Java, C#, C++, Objective-C, or any other suitable language.

Once all signatures (and any other data for user 102) have been entered, the document 150 may be ready for submission, and the user 102 may submit the signed document in the usual manner. For example, the user 102 may click or tap a button to send the signed document back to the document server 140. The document server 140 may then save the signed document.

As thus described, FIG. 1 shows an example in which signature entry for the user 102 is transferred from the first device 110 to the second device 120. Rather than requiring the first device 110, which may lack a touchscreen, to receive the signature of the user 102 directly, signature entry is instead transferred to the second device 120, which may have a touchscreen and thus support easy manual drawing of signatures. Not only are such signatures generally neater than those which could be entered on the first device 110, but also, they are actual hand-drawn signatures that look much like signatures of the user 102 written using pen and paper.

As described above, the second device 120 receives a manual signature 122 of the user 102 and transfers corresponding signature data 164 back to the first device 110, which incorporates the signature data 164 into the document 150. This is merely an example, however. Alternatively, the document server 140 may receive the signature data 164 obtained by the second device 120 and apply such signature data 164 directly to the document 150 stored on the document server 140, without any need to forward the signature data 164 to the first device 110. Thus, no further action may be required at the first device 110 after the user 102 scans the code 170. Operations 190 and 192 may thus be regarded as optional.

The example of FIG. 1 assumes that the document server 140 is configured to support the transfer of signature entry from one device to another. Legacy document services may not natively support this functionality, however. Embodiments may be provided herein that supply this lacking functionality and thus improve the operation of legacy document services.

Figure 2:
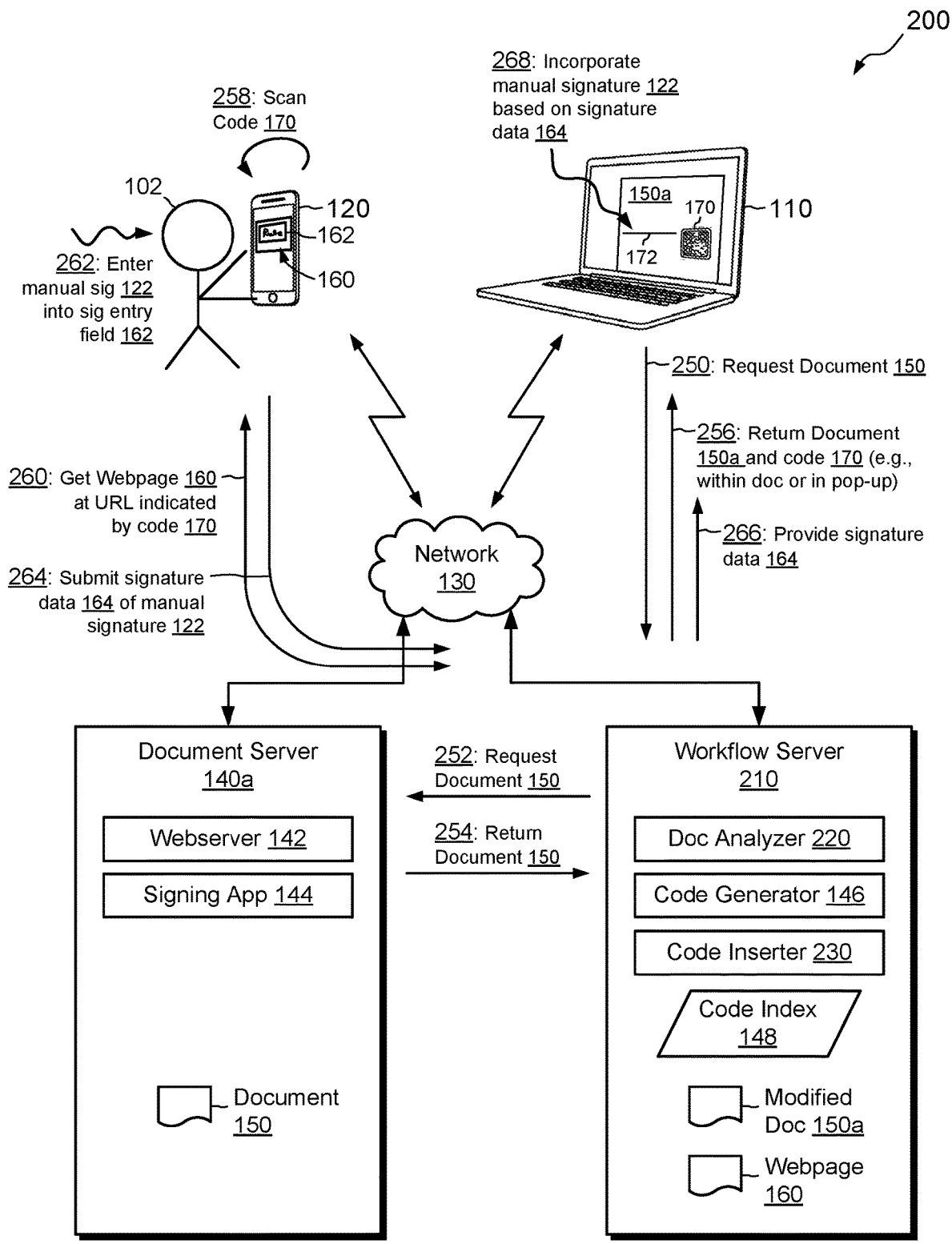
FIG. 2 is a block diagram of the example environment that includes both a document server and a workflow server.

FIG. 2 shows an example environment 200 in which the functionality of a legacy document service is augmented by enabling the transfer of signature entry from one user device to another. Here, the first device 110, second device 120, and network 130 may be realized substantially as described above. However, document server 140a may be part of a legacy service that does not natively support the transfer of signature entry. Thus, for example, the document server 140a does not include code generator 146, code index 148, or webpage 160, which are parts of the document server 140 of FIG. 1. Rather, components in FIG. 2 that support the transfer of signature entry may be provided by a separate workflow server 210.

In an example, workflow server 210 is realized using one or more computers connected to the network 130. Such computers include processors, memory, and interfaces that support software execution and communication over the network 130. In some examples, the workflow server 210 is operated by an entity separate from the legacy document service. The legacy document service may use the workflow server 210 as part of a third-party service that improves the experience of users. Alternatively, the workflow server 210 may operate transparently to the legacy document service, which need not be aware that the workflow server 210 is involved in document execution. For instance, the workflow server 210 may be part of a private, enterprise, cloud-based, or hybrid-cloud framework, which provides for the transfer of signatures to its users without the awareness of the legacy document service. As yet another example, the workflow server 210 may be incorporated as part of the legacy document service, e.g., as a component of that service.

In an example, the workflow server 210 is configured to intercept certain network activity of the first and second devices 110 and 120. For instance, workflow server 210 is configured to intercept outbound HTTP (HyperText Transfer Protocol) requests from devices 110 and 120 to the document server 140*a*, selectively blocking or modifying such requests, and to selectively forward such requests to specified destinations. Workflow server 210 may be further configured to intercept HTTP responses from the document server 140*a* to the devices 110 and 120 and to selectively block or modify such responses. In a non-limiting example, the first device 110 and the second device 120 are managed devices of a software framework operated by an organization. The framework monitors network activity of the devices 110 and 120 and implements policies. A non-limiting example of such a framework is Citrix Workspace, available from Citrix Systems, Inc. of Fort Lauderdale, Fla.

In the example shown, the workflow server 210 includes the above-described code generator 146, code index 148, and webpage 160, which are configured to perform similar functions as those described in connection with FIG. 1. Workflow server 210 may further include a document analyzer 220 and a code inserter 230. Document analyzer 220 is configured to analyze documents to determine whether they include signature entry fields. For example, document analyzer 220 is configured to search documents (e.g., webpages) for DOM (Document Object Model) elements that resemble signature-entry fields. Code inserter 230 is configured to modify such documents, e.g., by adding optically-readable codes 170 that enable signature transfer, and by associating the codes 170 with documents and parties, e.g., within code index 148.

An example methodology for signature transfer in the environment 200 includes operations 250, 252, 254, 256, 258, 260, 262, 264, 266, and 268. For simplicity, differences are emphasized below between this methodology and the one described in connection with FIG. 1, while details that are similar to the FIG. 1 methodology have already been covered and will not be repeated here.

At 250, user 102 operates the first device 110 to request a document 150 to be signed. For example, user 102 may click a link received by the first device 110 in an email or text message, which results in an HTTP request being directed to the document server 140*a*. Here, the workflow server 210 intercepts the HTTP request issued at 250. The workflow server 210 may analyze the HTTP request and identify therefrom the associated device, user, source address, destination address, and/or other factors. In an example, the workflow server 210 modifies the HTTP request by replacing the source address (that of device 110) with its own address and stores the source address of device 110 for later use when sending back an HTTP response.

At 252, the workflow server 210 forwards the modified HTTP request to the document server 140*a*, i.e., to the destination address specified by the HTTP request. The document server 140*a* receives the modified request and processes the request in the usual manner, i.e., in the manner specific to the particular document service.

At 254, the document server 140*a* responds to the modified HTTP request by returning the requested document 150. As the source address now specifies that of the workflow server 210, the document server 140*a* sends the document 150 in an HTTP response to the workflow server 210.

The workflow server 210 receives the document 150, and the document analyzer 220 analyzes the document 150. For example, the document analyzer 220 checks the DOM of the webpage that contains the document 150 for any known field names and/or configurations that are typical of signature-entry fields used by popular document signing services, such as DocuSign, AdobeSign, and the like. In an example, the document analyzer 220 identifies the particular document signing service from a server name provided in the HTTP request received at 250. Alternatively, it may identify the service by accessing metadata associated with the page and/or by matching patterns in the page with patterns known to be used by respective services. The document analyzer 220 may apply a search algorithm to locate signature-entry fields known to be used by the identified service. The document analyzer 220 may also search the document 150 for identifiers of particular parties, e.g., using similar methods and/or other page-scraping techniques.

When analysis of document 150 is complete, the document analyzer 220 has determined (1) whether the document 150 contains a signature-entry field for the user 102 and (2) the location in the document of the first signature-entry field of the user 102. If the document analyzer 220 finds no signature-entry field for the user 102, then the workflow server 210 may simply return the document 150 to the first device (subject to any other policy-based action) and the relevant activity ends. However, for the present example we assume that the document analyzer 220 has found at least one signature-entry field for the user 102 in the document 150 and has identified the location of the first such field.

Code inserter 230 then proceeds to modify the document 150 to support signature transfer between user devices. For example, code inserter 230 invokes code generator 146 to (1) dynamically generate a webpage 160, which includes a signature-entry field for user 102, (2) identify a URL of the webpage 160, and (3) generate an optically-readable code 170 that encodes the identified URL of the webpage 160. Code inserter 230 then modifies the document 150 to create a modified document 150*a*, which includes the contents of document 150 as well as the generated code 170. For example, the code inserter 230 places the generated code 170 into the document adjacent to the first signature-entry field 172 for the user 102.

At 256, the workflow server 210 provides a modified version of the HTTP response to the first device 110. The modified version includes the modified document 150*a*, which contains the new code 170. Upon completion of operation 256, the first device 110 displays the modified document 150*a*, which includes the code 170, which enables signature transfer. At this point, the user 102 may enter any requested data into any non-signature fields of the modified document 150*a*.

At 258, the user 102 operates the second device 120 to scan the code 170. The second device 120 then converts the scanned code 170 to a URL, which in this case identifies the location of the webpage 160 on the workflow server 210.

At 260, the second device 120 requests and receives the webpage 160 from the workflow server 210, i.e., at the location identified by the URL. The second device 120 then displays the webpage 160, which includes a signature-entry field 162 associated with user 102 and document 150a.

At 262, the user 102 enters a manual signature 122 into the signature-entry field 162. For example, the user 102 draws his or her signature 122 using a finger or stylus. The second device 120 receives the signature 122 and records signature data 164.

At 264, the user 102 submits the signature data 164 to the workflow server 210. The workflow server receives the signature data 164 and associates such data with the modified document 150a and user 102.

At 266, the workflow server 210 provides the signature data 164 to the first device 110.

At 268, the first device 110 incorporates the manual signature 122 into the first signature-entry field 172 based on the signature data 164. The user 102 may complete additional signature fields (if any) and then submit the completed document, which may be received by the workflow server 210 and forwarded to the document server 140a.

As thus described, the FIG. 2 methodology enhances legacy document-signing services by providing signature-transfer capabilities which those services do not natively support. The FIG. 2 methodology thus improves user experience across a wide variety of document-signing services, with those services able to remain oblivious to the fact that their usability has been improved. Of course, such services may also employ the FIG. 2 methodology deliberately, as a way of augmenting their own capabilities and hence the experience of their own users.

As in the FIG. 1 example, the FIG. 2 example may also involve providing codes 170 in separate windows (e.g., pop-up windows) rather than within documents to be signed. In such cases, it may not be necessary to modify documents. Rather, device 110 may render document 150 in one window and may render code 170 in another window.

Also, some embodiments may use signature data 164 obtained from the second device 120 directly as a signature on the document. Thus, signature data 164 need not be sent to the first device 110 and the first device 110 need not incorporate signature data 164 into the signature-entry field 172. Operations 266 and 268 may thus be considered optional for such embodiments.

Further, some embodiments involve the use of a custom browser or browser plug-in running on the first device 110. In such examples, the document analyzer 220 and code inserter 230 may be implemented within the custom browser or browser plug-in, rather than within the workflow server 210. It may still be advantageous, however, for the workflow server 210 to operate the code generator 146 and code index 148, as those components may be applicable to multiple documents and parties.

The examples described so far assume that codes 170 are provided at the same time as the respective documents, e.g., within the documents themselves or in other windows, such as pop-ups. However, some embodiments allow codes 170 to be sent much later or not at all. For example, some embodiments may send no code 170 unless or until the user 102 has taken an action that indicates an intention to sign.

Figure 3:
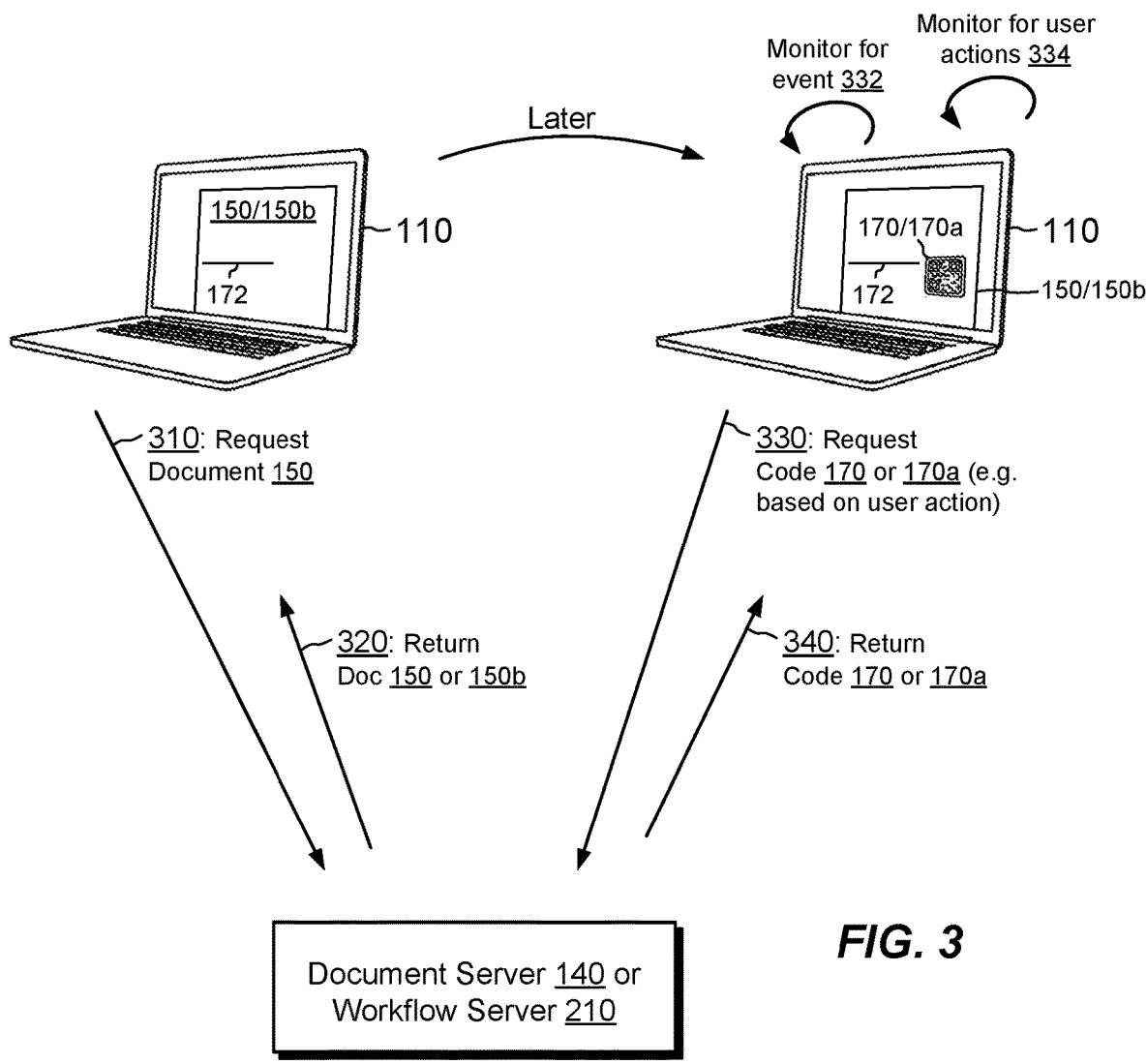
FIG. 3 is a block diagram showing an example arrangement in which a first device initially receives a document before it later receives an optically-readable code.

FIG. 3 shows an example arrangement in which documents are initially sent without associated codes 170. The example of FIG. 3 is applicable in both the FIG. 1 and FIG. 2 arrangements. The FIG. 3 example potentially saves processing resources by avoiding generation of webpages 160 and codes 170 until the user 102 actually decides to sign.

Example operation begins at 310, with the first device 110 requesting a document 150 to be signed. For example, the user 102 of device 110 may click a link in an email or text message that asks the user to review and sign the document 150, e.g., in the manner described above.

At 320, the document server 140 (FIG. 1 example) or the workflow server 210 (FIG. 2 example) responds to the request by providing the document 150, but this time without the optically-readable code 170. Also, no separate page or window is provided that includes the code 170. The first device 110 then displays the document. The user 102 may review the document and may enter data into non-signature fields In some examples, the document provided during operation 320 is an altered version 150b of the document 150. The altered version 150b may include a placeholder at which a later-received code 170 may be inserted. The placeholder may be provided, for example, as an HTML element, such as a DIV element, SPAN element, IMG element, or the like, which has been added to the document 150, e.g., adjacent to the first signature-entry field 172 for the user 102. The added HTML element may have a unique name or identifier that enables it to be easily located within the document 150b at a later time.

While it displays the document (150 or 150b), the first device 110 may monitor for an event 332. An example of an event 332 is a user selection, such as click or focus, on a signature-entry field, such as the first signature-entry field 172. As an example, the signature-entry field 172 has an associated event procedure, which responds to a click or focus event. When the user 102 clicks on the field 172 or otherwise causes the field 172 to get focus, the associated event procedure is run. In an example, the event procedure includes instructions for issuing a request to obtain an optically-readable code 170.

At 330, the first device 110 issues the request for the code 170 to the document server 140 (or workflow server 210). In an example, the operation 330 is performed in response to the first device 110 detecting an event 332 and running the associated event procedure.

At 340, the document server 140 (FIG. 1) or workflow server 210 (FIG. 2) responds by returning the requested code 170. If the document obtained at 320 was altered to include a placeholder, the first device 110 inserts the received code 170 at the location of the placeholder, e.g., within the HTML element provided for this purpose. If the document obtained at 320 has not been altered to include a placeholder, the code 170 may be provided at some other location in the document or in a separate window. In either case, the first device 110 displays the code 170 either within or alongside the document. With the first device 110 displaying both the document and the associated code 170, operation for signature transfer may proceed as described above, e.g., by scanning the code 170 using the second device 120 (see, for example, operation 182 of FIG. 1 or operation 258 of FIG. 2).

As further shown in FIG. 3, the first device 110 may also monitor for user actions 334, such as data entry into fields of the displayed document. For example, the displayed document 150 or 150b may include non-signature fields, such as name, address, phone number, and/or the like, into which the user 102 may enter data. In certain embodiments, the presence or absence of user actions 334 to enter non-signature data determines how signature transfer proceeds.

For example, if the first device 110 determines that a user action 334, such as data entry into a non-signature field, has occurred prior to detecting an event 332 (e.g., a click or focus on a signature field), then the signing procedure may involve sending signature data 164 obtained by the second device 120 to the first device 110 for incorporation into the document (as shown, for example, in operations 190 and 192 of FIG. 1 or 266 and 268 of FIG. 2). However, if the first device 110 determines that no user action 334 has occurred prior to detecting an event 332, then the signing procedure may involve a complete handoff to the second device 120, with no need to send signature data 164 back to the first device 110 or to incorporate the signature data into the signature-entry field 172. Thus, whether the user 102 has entered data into a non-signature field determines whether the second device 120 is used merely for signature entry, with operation resuming at the first device 110 thereafter, or whether the second device 120 is used to entirely complete the signing procedure without further involvement of the first device 110.

In an example, complete handoff to the second device 120 may involve the use of a different optically-readable code. For instance, rather than providing a code 170 that provides a URL of a webpage 160 (which may include only a single data-entry field), the handoff scenario may involve providing a different optically-readable code 170*a*, which encodes a URL of a webpage that provides the document 150 itself. The user 102 may then complete execution of the document on the second device 120 without returning to the first device 110.

To this end, the request for the code at step 330 of FIG. 3 may specify whether to return a code 170 or a code 170*a*, i.e., whether the returned code should contain the URL of the webpage 160 or the URL of the document 150. Here, step 330 requests a code 170 if the user 102 has already entered data, but requests a code 170*a* if the user has not. An example rationale for this difference in behavior is to avoid forcing the user 102 to reenter the same data on the second device 120 that the user has already entered on the first device 110, and thus to promote a favorable user experience.

Figure 4:
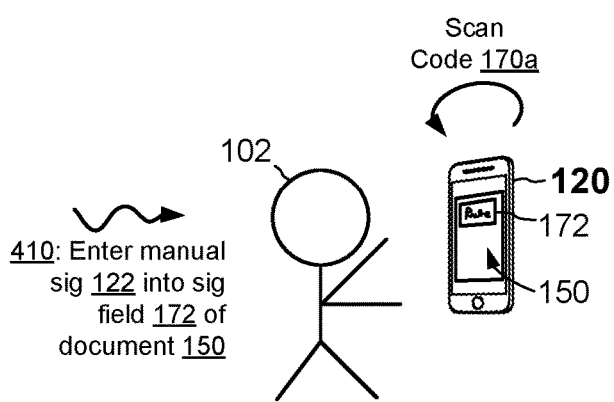
FIG. 4 is a block diagram showing an example arrangement in which a second device receives a manually-entered signature into a webpage that displays the document to be signed.

FIG. 4 shows an example of this handoff arrangement from the point of view of the second device 120. As shown, the user 102 operates the second device 120 to scan a code 170*a* displayed by the first device 110. The code 170*a* specifies the URL of the document 150. The second device 120 follows the URL specified by the code 170*a* and downloads the document 150 (rather than the webpage 160). The second device 120 displays the document 150, including the signature-entry field 172 and any other fields. The user 102 may enter any requested non-signature data. At 410, the user 102 enters a manual signature 122 into the signature-entry field 172. The user 102 may complete any other signature-entry fields and may then submit the executed document, e.g., by sending the executed document to the document server 140 or workflow server 210.

FIGS. 5-9 show example methods that may be carried out in the environment 100 and/or 200. Such methods may be performed, for example, by the software constructs described in connection with FIGS. 1 and 2, which reside in the memories of the first device 110, second device 120, and/or document server 140, as well as the workflow server 210 (in the FIG. 2 example), and may be run by the respective processors. The depicted acts of the illustrated methods may be performed in any suitable order, which may include performing some acts simultaneously.

Figure 5:
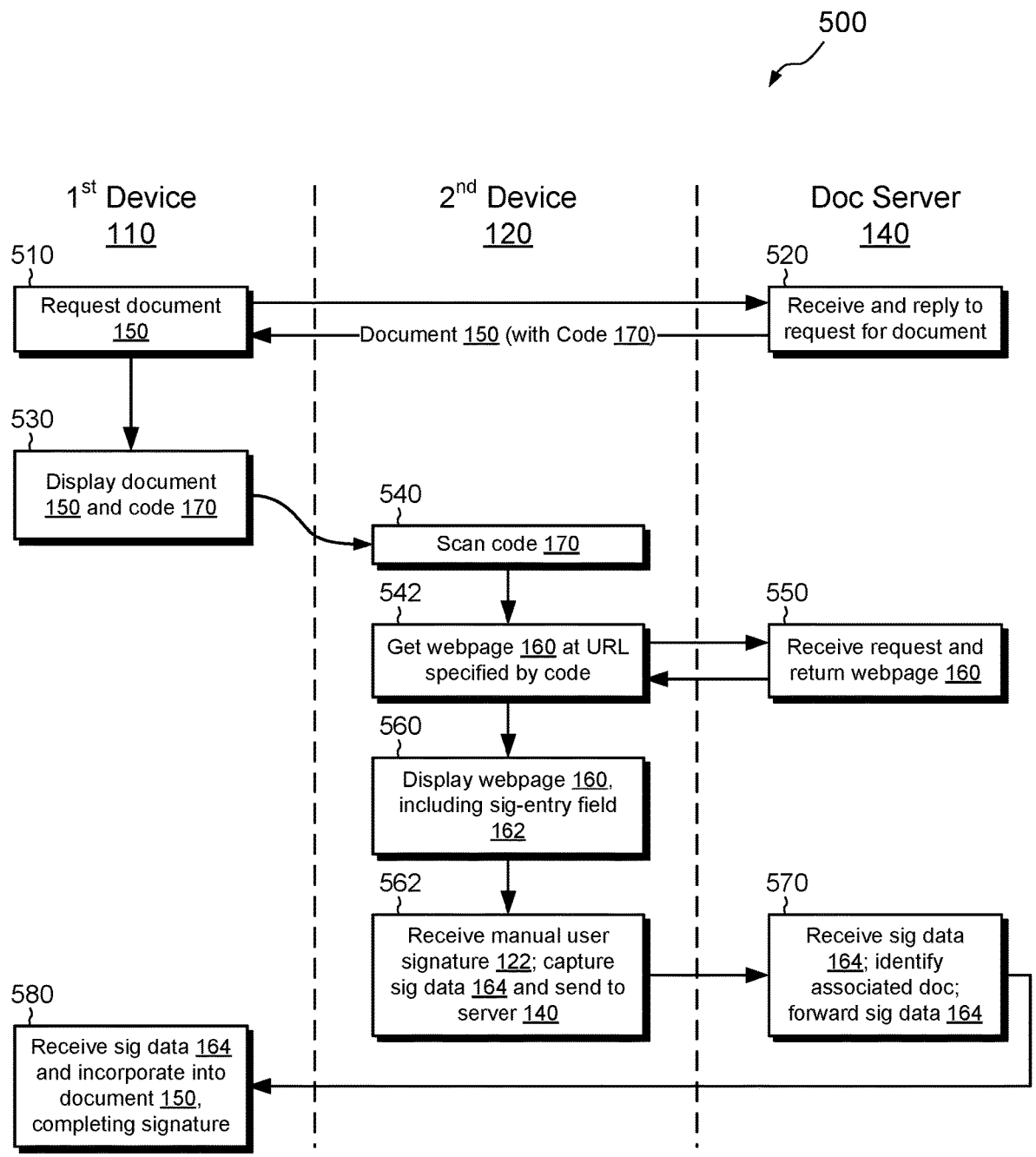
FIG. 5 is a flowchart showing an example method of obtaining a document and a code from a document server and transferring the signing of a document from a first device to a second device.

FIG. 5 shows an example method 500, which may be performed, for example, in the environment 100 of FIG. 1, e.g., in which a document server 140 is configured to support the transfer of signature entry between user devices. As shown, the method 500 involves activity among the first device 110, the second device 120, and the document server 140.

At 510, the first device 110 requests a document 150 to be signed. For example, the user 102 may operate the first device 110 to download the document 150, and the first device 110 may respond by sending a request for the document (e.g., an HTTP request) to the document server 140.

At 520, the document server 140 receives the request and responds by sending a response (e.g., an HTTP response), which includes the requested document 150 and an optically-readable code 170. The code 170 may be embedded within the document 150 or may be provided in a separate page, such as a pop-up page. The document 150 may include a signature-entry field 172.

At 530, the first device 110 displays the document 150 and the code 170, e.g., as one or more webpages in a browser or other application. At this time the user 102 may enter data into any non-signature fields of the document 150. The user 102 may then decide to sign the document 150.

At 540, the second device 120 scans the code 170 being displayed by the first device 110. For example, the user 102 points a camera of the second device 120 toward the code 170 and takes a picture of the code 170.

At 542, the second device 120 analyzes the code 170 from the picture and converts the code 170 to text, revealing the URL of a webpage 160, e.g., a page that includes a signature-entry field 162 for the document 150. The second device 120 then contacts the document server 140 to download the webpage 160.

At 550, the document server 140 receives the request from the second device 120. The document server 140 responds by providing the requested webpage 160.

At 560, the second device 120 receives and displays the webpage 160, e.g., in a browser or app running on the second device 120. The displayed webpage 160 includes the signature-entry field 162.

At 562, the second device 120 receives a manually entered signature of the user 102 into the field 162. As the signature 122 is being entered, the second device 120 captures signature data 164 that represents the signature 122 and enables reproduction thereof. The second device 120 then sends the signature data 164 to the document server 140.

At 570, the document server 140 receives the signature data 164. The document server 140 associates the signature data 164 with the corresponding document 150 and user 102 (e.g., by referencing the code index 148). The document server 140 then sends the signature data 164 to the first device 110.

At 580, the first device 110 receives the signature data 164 and incorporates the signature data 164 into the document 150, e.g., by replaying or otherwise reproducing the signature 122 into the signature-entry field 172. At this point, signature entry is complete.

As described previously, some embodiments may apply the signature data 164 from the second device 120 directly in completing the document's execution. In such embodiments, act 580 may be omitted and act 570 may be adjusted so that the received signature data 164 is saved by the document server 140 as the user's signature. In this case, no forwarding of the signature data 164 to the first device 110 would be required.

Figure 6:
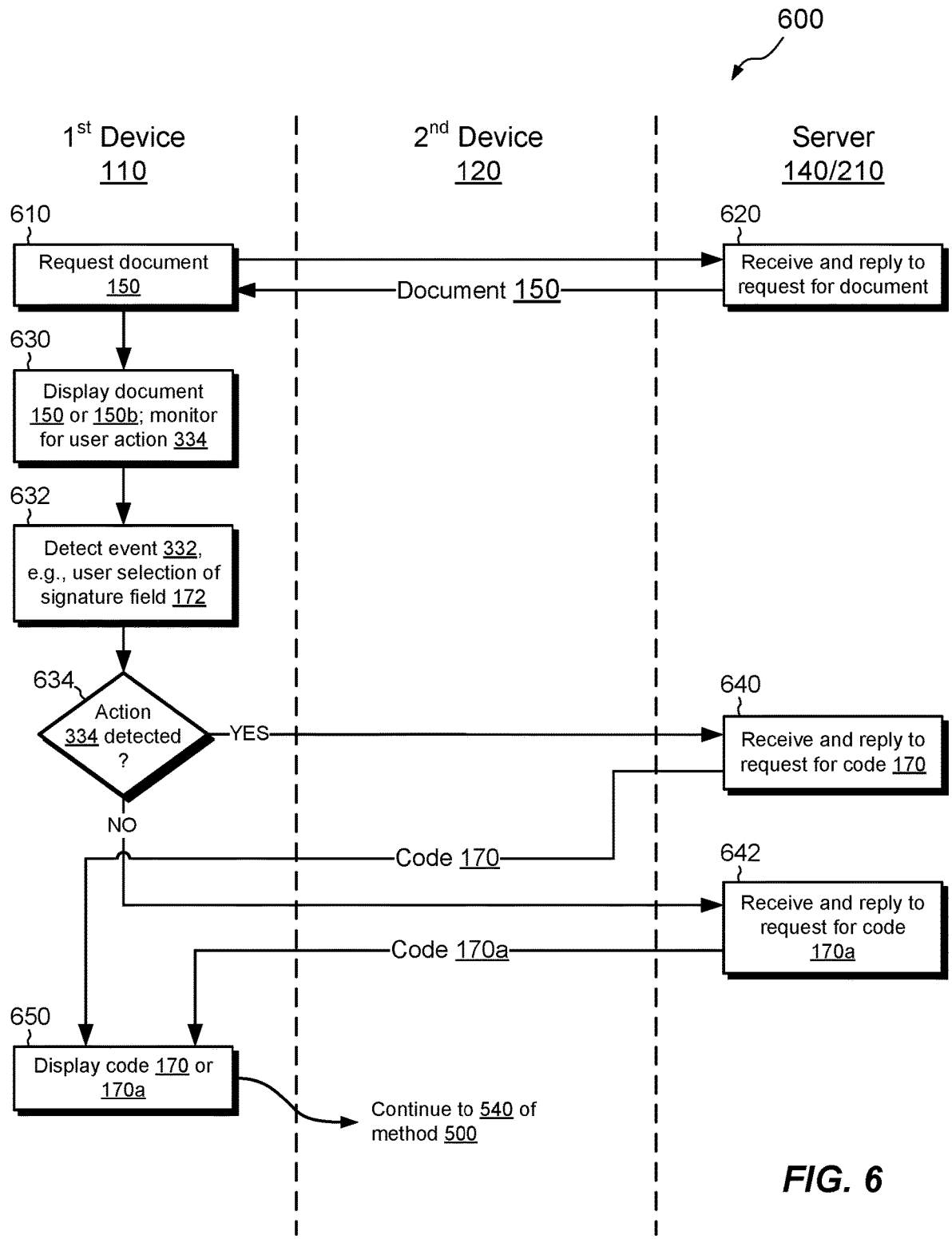
FIG. 6 is a flowchart showing an example method of obtaining a document from a document server without a code, later obtaining a code, and then transferring the signing of a document from a first device to a second device using the code.

FIG. 6 shows an example method 600 in which a document is initially received without an optically-readable code, which may be provided later (see FIGS. 3 and 4). The method 600 may be carried out in the environments 100 and/or 200 of FIGS. 1 and 2, respectively, and involves activity among the first device 110, the second device 120, and a server 140/210, which may be a document server 140 (FIG. 1) or a workflow server 210 (FIG. 2).

At 610, the first device 110 requests a document 150 to be signed. For example, the first device 110 responds to a user action by sending a request for the document 150 to the server 140/210.

At 620, the server 140/210 receives the request and responds by providing the document. No code 170 is provided at this time. The document may be an unaltered version 150 or an altered version 150*b*, e.g., one that contains a placeholder for a later-received code 170).

At 630, the first device 110 displays the document 150 or 150*b* and monitors for a user action 334, such as data entry into a non-signature field of the document.

At 632, the first device 110 detects an event 332 that indicates an intent of the user to sign, such as the signature-entry field 172 being clicked or receiving focus.

At 634, the first device 110 determines whether a user action 334 has been detected, e.g., whether the user 102 has entered data into the document. If yes, operation proceeds to 640, whereupon the server 150/210 receives the request and responds by providing the code 170, i.e., the code that contains the URL of the webpage 160. If no, operation proceeds instead to 642, whereupon the server 150/210 receives the request and responds by providing the code 170*a*, i.e., the code that contains the URL of the document 150.

At 650, the first device 110 receives the code 170 or 170*a*. If the document includes a placeholder, the first device 110 may place the code 170 or 170*a* into the document at the location of the placeholder. If no placeholder is provided, the first device 110 may place the code at any suitable location in the document or in a separate window. Either way, the first device 110 displays both the document and the code 170 or 170*a*.

Operation may then proceed as described in act 540 of method 500, e.g., with the second device 120 scanning the code 170 or 170*a* to download a webpage that enables the user 102 to sign using the second device 120. The webpage may be the webpage 160 (for code 170), or it may be a webpage that contains the document 150 (for code 170*a*). In the latter case, execution of the document 150 may be handed off entirely to the second device 120.

Figure 7:
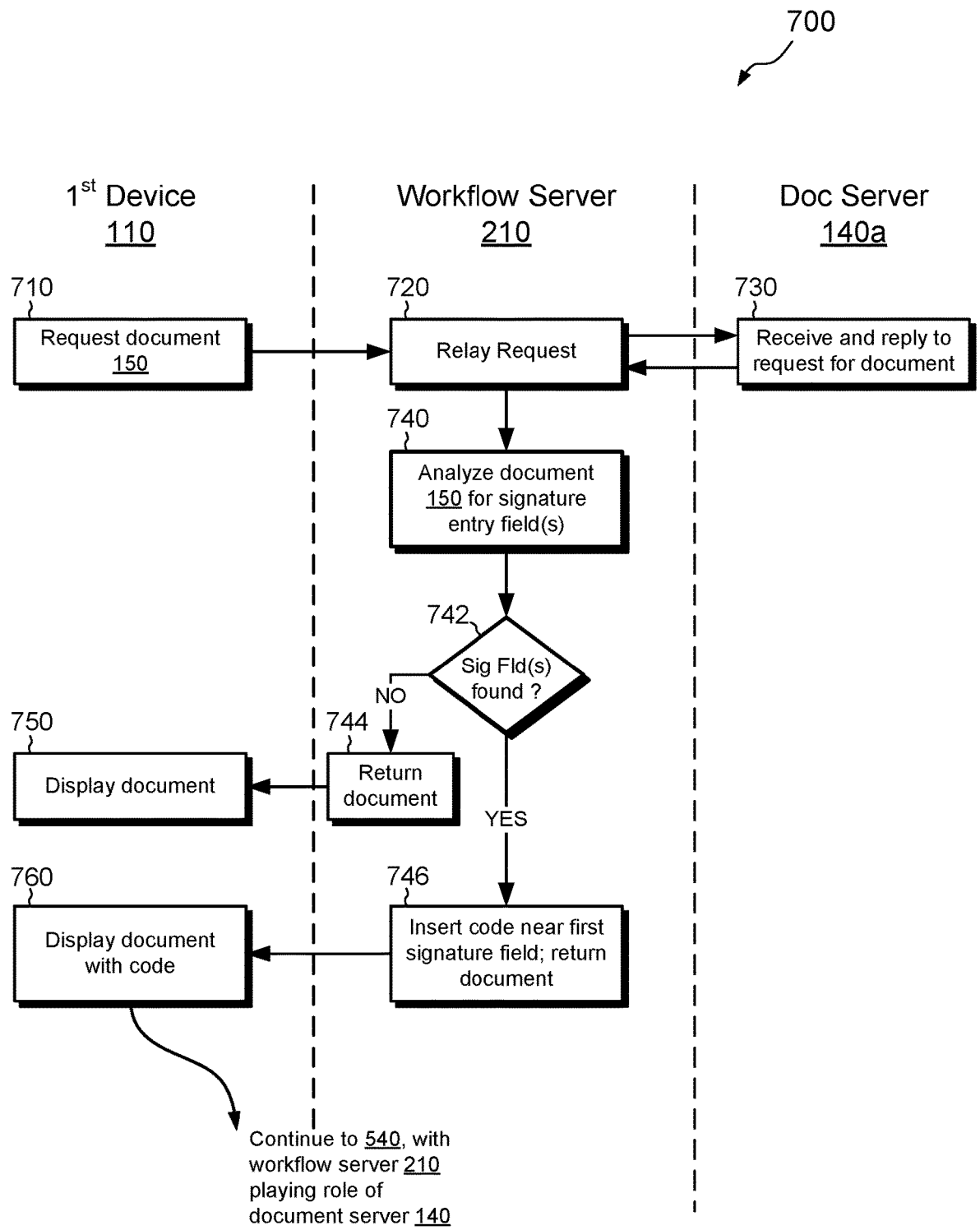
FIG. 7 is a flowchart showing an example method of obtaining a document via a workflow server that analyzes the document and selectively provides a code to enable transfer of the signing of the document from a first device to a second device.

FIG. 7 shows an example method 700 which may be carried out in connection with the environment 200 of FIG. 2. Method 700 involves activity among the first device 110, the document server 140*a*, and the workflow server 210 (FIG. 2) and thus may apply to scenarios in which a legacy document service does not natively support the transfer of signature entry between user devices.

At 710, the first device 110 requests a document 150 for signature, e.g., in response to an action by user 102. The request may be directed to the document server 140*a* (e.g., a server of the legacy service), but the request is intercepted by the workflow server 210.

At 720, the workflow server 210 receives the request and optionally modifies the request (e.g., by replacing the source address with its own address). The workflow server 210 then forwards the request to the document server 140*a*.

At 730, the document server 140*a* receives the request. The document server 140*a* responds to the request by providing the requested document to the workflow server 210.

At 740, the workflow server 210 analyzes the document to determine whether it is a document to be signed. For example, the workflow server 210 scans the document for signature-entry fields.

At 742, the workflow server 210 performs respective acts depending on whether the document 150 is a document to be signed. If yes, operation proceeds to 746, whereupon the workflow server 210 inserts a code 170 near the first signature-entry field 172 of the document. Alternatively, the code 170 may be provided in a separate page. The workflow server 210 then transmits the document with the code (embedded or separate) back to the first device 110, which displays the document at 760 and the code 170. Operation then proceeds as described in connection with act 540 of method 500, but with the workflow server 210 performing the role of the document server 140.

If the document is not a document to be signed, then operation proceeds instead to 744, whereupon the workflow server 210 may return the document 150 to the first device 110, without inserting any code 170. At 750, the first device 110 may display the document in the usual manner, e.g., as it would display any downloaded webpage.

Although the example of method 700 provides that the code 170 is inserted into the document at 746, a placeholder such as an HTML element may be inserted instead, e.g., to support later provision of the code 170. Also, the code may be provided as a code 170*a*, i.e., one that specifies a URL that points to a webpage containing the document 150, rather than to a webpage 160 providing a signature-entry field 162.

Figure 8:
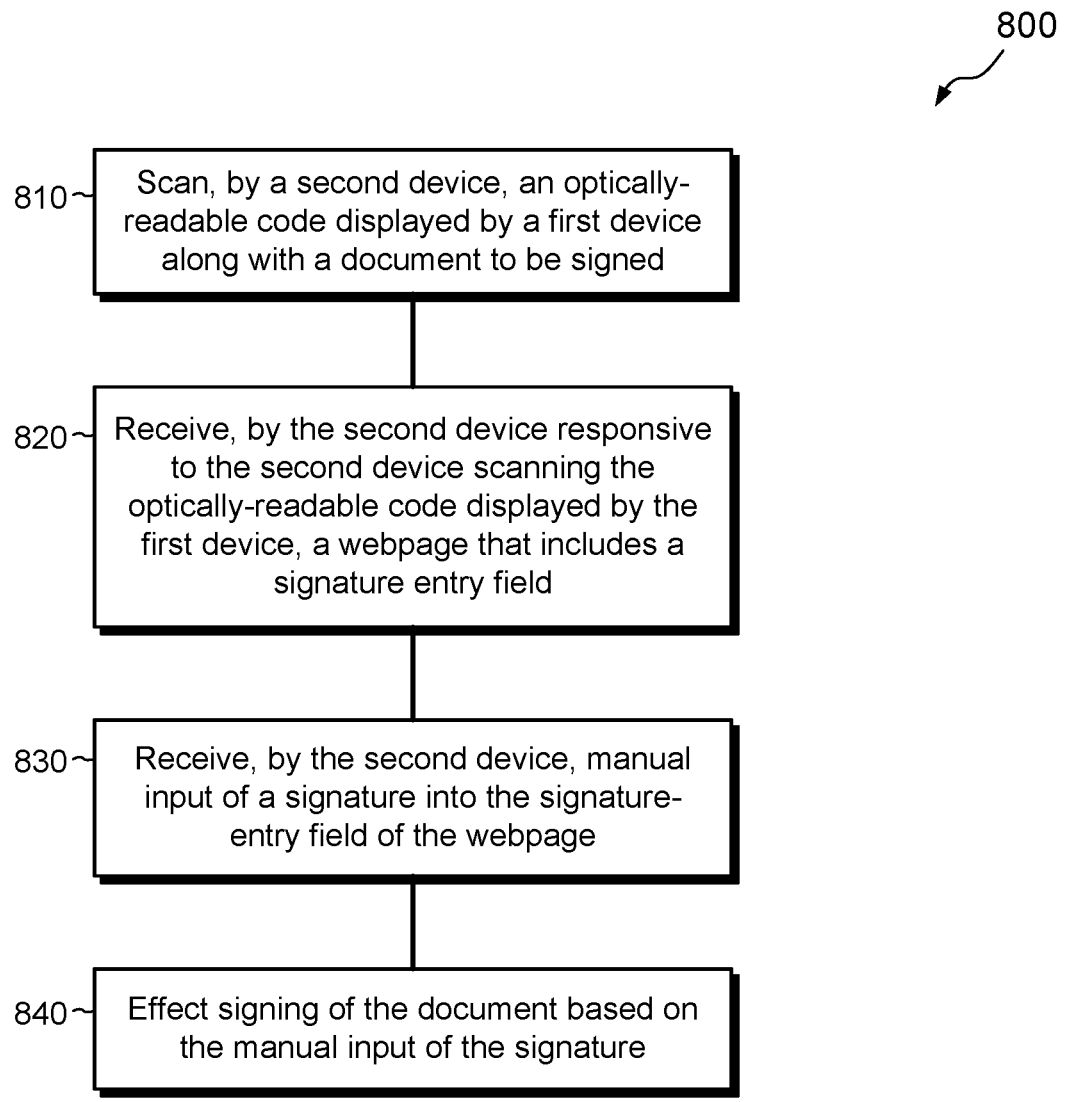
FIG. 8 is a flowchart showing an example client-side method of obtaining a manually-entered electronic signature for a document.

FIG. 8 shows an example method 800 that may be carried out in connection with any of the above-described embodiments. Method 800 may be performed, for example, by the second device 120, such as the one shown in FIGS. 1, 2, and 4.

At 810, the second device 120 scans an optically-readable code 170 or 170*a* displayed by the first device 110 along with a document to be signed (such as document 150, 150*a*, or 150*b*). For example, the second device 120 takes a picture of the code using a camera of the second device 120.

At 820, the second device 120 receives a webpage that includes a signature entry field, e.g., responsive to the second device scanning the optically-readable code displayed by the first device 110. The webpage may be the webpage 160, which provides a signature-entry field 162, or it may be a webpage containing the document, which provides a signature-entry field 172 (e.g., in the handoff example).

At 830, the second device 120 receives manual input of a signature 122 into the signature-entry field 172 or 162 of the webpage. As the signature 122 is entered, the second device 120 may record signature data 164, which enables the signature 122 to be replayed or otherwise reproduced.

At 840, a signing of the document is effected based on the manual input of the signature 122. As one example, the second device 120 sends the signature data 164 to a server 140 or 210, which forwards the signature data 164 to the first device 110 for incorporation into a signature-entry field 172 therein. As another example, the second device 120 may complete the signing process without further involvement of the first device 110, e.g., by sending the signature data 164 to the server 140 or 210 or by otherwise completing the document on the second device 120.

Figure 9:
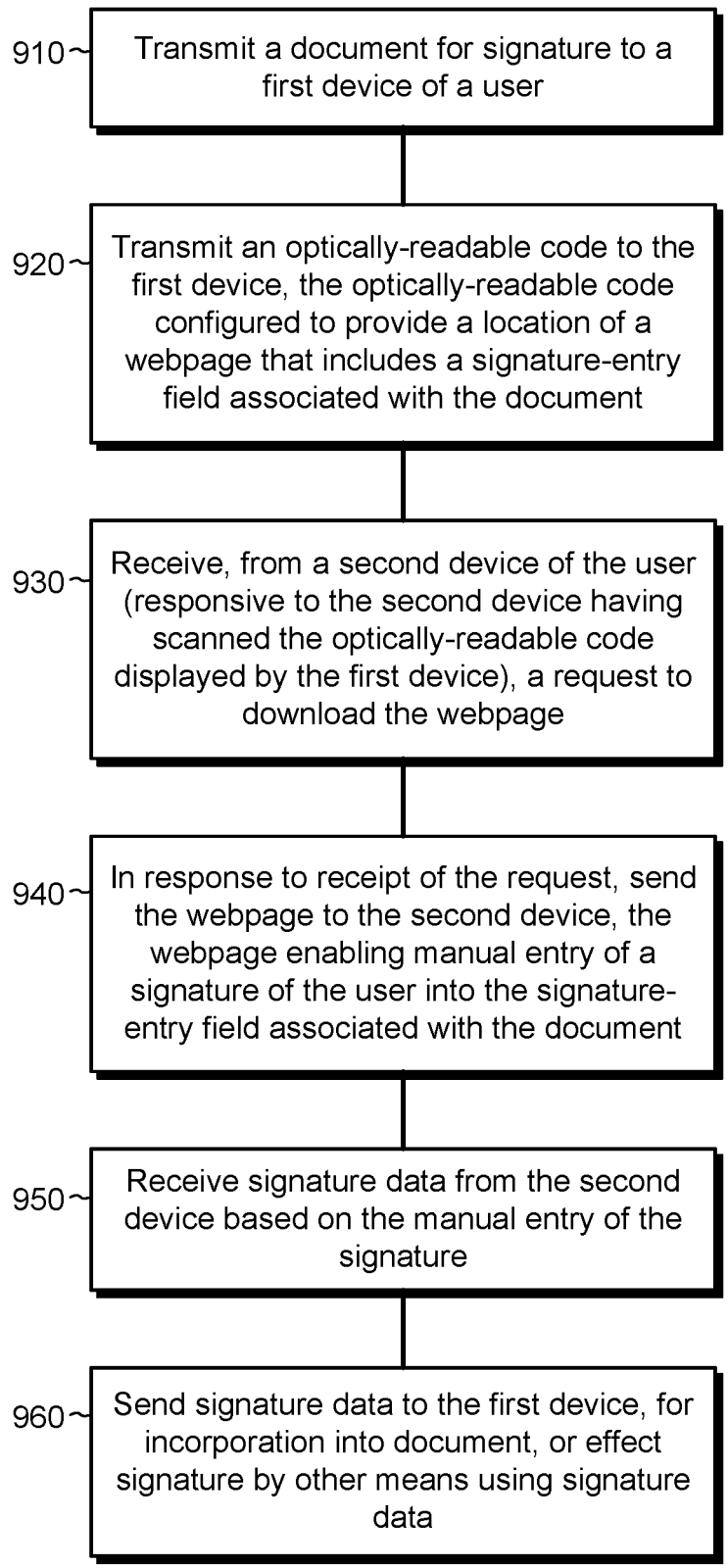
FIG. 9 is a flowchart showing an example server-side method of obtaining a manually-entered electronic signature for a document.

FIG. 9 shows an example method 900 that may be carried out in connection with any of the above-described embodiments. Method 900 may be performed, for example, by a server 140/210, such as the document server 140 of FIG. 1 or the workflow server 210 of FIG. 2.

At 910, the server 140/210 transmits a document for signature to a first device 110 of a user. The document may be provided as any of documents 150, 150*a*, or 150*b*, for example.

At 920, the server 140/210 transmits an optically-readable code to the first device 110. The optically-readable code, such as code 170 or 170a, is configured to provide a location of a webpage that includes a signature-entry field associated with the document. As before, the webpage may be webpage 160, which provides a signature-entry field 162, or it may be a webpage containing the document, which provides a signature-entry field 172 (e.g., to support the handoff example).

At 930, the server 140/210 receives, from a second device 120 of the user, a request to download the webpage. For example, the server receives the request responsive to the second device 120 having scanned the optically-readable code, which may be displayed by the first device 110.

At 940, in response to receiving the request, the server 140/210 sends the webpage to the second device 120. The webpage enables manual entry of a signature 122 of the user into the signature-entry field 172 or 162 associated with the document.

At 950, the server 140/210 receives signature data 164. For example, the server 140/210 receives the signature data 164 from the second device 120 based on a manual entry of the signature 122 on the second device 120.

At 960, the server 140/210 sends the signature data 164 to the first device 110 for incorporation into the document. Alternatively, the server 140/210 may use the signature data 164 to effect signing of the document in some other manner, such as by directly using the signature data 164 as the user's signature on the document without further involvement of the first device 110.

Further information is provided below in connection with FIGS. 10 and 11. These figures illustrate an example environment in additional detail. Such detail is provided for purposes of illustration and is not intended to be limiting.

Figure 10:
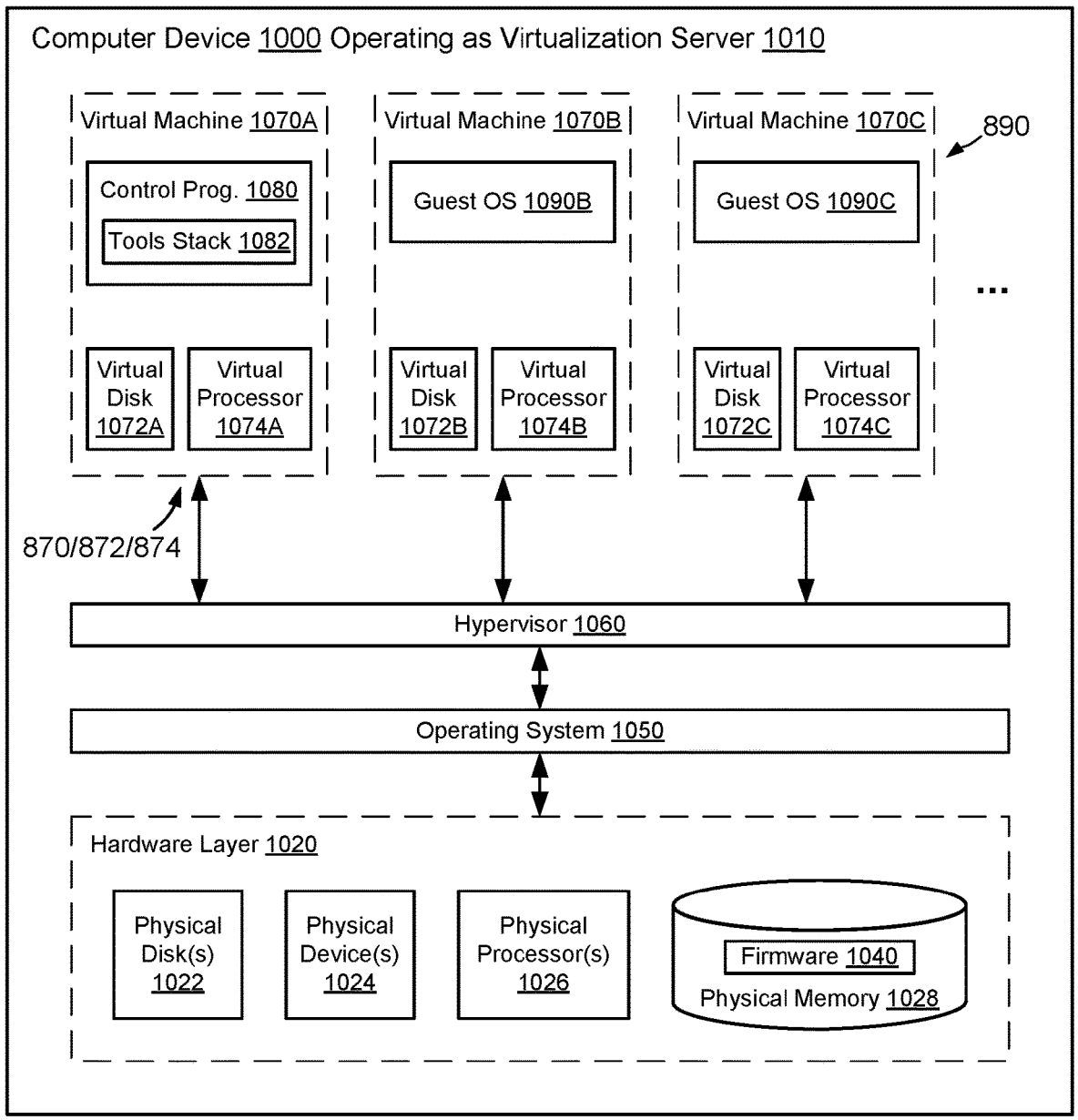
FIG. 10 is a block diagram of a virtualization server which is suitable as a document server and/or workflow server in accordance with certain embodiments.

FIG. 10 shows a computer device 1000 operating as a virtualization server 1010 which is suitable for providing document preparation and signing services within the computing environment in accordance with certain embodiments. It should be understood that FIG. 10 shows a high-level architecture of an illustrative desktop virtualization system. Such a system is suitable for use as at least a portion of the document server 140 and/or workflow server 210 (FIGS. 1 and 2).

As shown in FIG. 10, the desktop virtualization system may be a single-server or multi-server system, or a cloud system, including at least one computer device 1000 operating as a virtualization server 1010 configured to provide virtual desktops and/or virtual applications to one or more client access devices (e.g., user devices 102, which may include the above-described first device 110 and/or second device 120). As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

The computer device 1000 may be configured as a virtualization server in a virtualization environment, for example, a single-server, multi-server, or cloud computing environment. Virtualization server 1010 illustrated in FIG. 10 may be deployed as and/or implemented by one or more embodiments of the earlier-mentioned electronic signature platform 104 or by other known computing devices. Included in virtualization server 1010 is hardware layer 1020 that may include one or more physical disks 1022, one or more physical devices 1024, one or more physical processors 1026, and one or more physical memories 1028. In some embodiments, firmware 1040 may be stored within a memory element in physical memory 1028 and be executed by one or more of physical processors 1026. Virtualization server 1010 may further include operating system 1050 that may be stored in a memory element in physical memory 1028 and executed by one or more of physical processors 1026. Still further, hypervisor 1060 may be stored in a memory element in physical memory 1028 and be executed by one or more of physical processors 1026. Presence of operating system 1050 may be optional such as in a case where the hypervisor 1060 is a Type A hypervisor.

Executing on one or more of physical processors 1026 may be one or more virtual machines 1070A, 1070B, 1070C, ... (generally, VMs 1070). The VMs 1070A, 1070B, 1070C, ... include respective virtual disks 1072A, 1072B, 1072C, ... (generally, virtual disks 1072) and respective virtual processors 1074A, 1074B, 1074C, ... (generally, virtual processors 1074). In some embodiments, the first VM 1070A may execute, using virtual processor 1074A, control program 1080 that includes tools stack 1082. Control program 1080 may be referred to as a control virtual machine, Domain 0, Dom0, or other virtual machine used for system administration and/or control. In some embodiments, one or more VMs 1070B, 1070C, ... may execute, using their respective virtual processors 1074B, 1074C, ..., guest operating systems 1090B, 1090C, ... (generally, guest operating systems 1090).

Physical devices 1024 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 1010. Physical memory 1028 in hardware layer 1020 may include any type of memory. Physical memory 1028 may store data, and in some embodiments may store one or more programs, or set of executable instructions. FIG. 10 illustrates an embodiment where firmware 1040 is stored within physical memory 1028 of virtualization server 1010. Programs or executable instructions stored in physical memory 1028 may be executed by the one or more processors 1026 of virtualization server 1010.

Virtualization server 1010 may also include hypervisor 1060. In some embodiments, hypervisor 1060 may be a program executed by processors 1026 on virtualization server 1010 to create and manage any number of virtual machines 1070. Hypervisor 1060 may be referred to as a virtual machine monitor, or platform virtualization software. In some embodiments, hypervisor 1060 may be any combination of executable instructions and hardware that monitors virtual machines 1070 executing on a computing machine. Hypervisor 1060 may be a Type 2 hypervisor, where the hypervisor executes within operating system 1050 executing on virtualization server 1010. Virtual machines may then execute at a layer above hypervisor 1060. In some embodiments, the Type 2 hypervisor may execute within the context of a user's operating system such that the Type 2 hypervisor interacts with the user's operating system. In other embodiments, one or more virtualization servers 1010 in a virtualization environment may instead include a Type 1 hypervisor (not shown). A Type 1 hypervisor may execute on virtualization server 1010 by directly accessing the hardware and resources within hardware layer 1010. That is, while Type 2 hypervisor 1060 accesses system resources through host operating system 1050, as shown, a Type 1 hypervisor may directly access all system resources without host operating system 1010. A Type 1 hypervisor may execute directly on one or more physical processors 1026 of virtualization server 1010, and may include program data stored in physical memory 1028.

Hypervisor 1050, in some embodiments, may provide virtual resources to guest operating systems 1090 or control programs 1080 executing on virtual machines 1070 in any manner that simulates operating systems 1090 or control programs 1080 having direct access to system resources. System resources can include, but are not limited to, physical devices 1022, physical disks 1024, physical processors 1026, physical memory 1028, and any other component included in hardware layer 1020 of virtualization server 1010. Hypervisor 1060 may be used to emulate virtual hardware, partition physical hardware, virtualize physical hardware, and/or execute virtual machines that provide access to computing environments. In still other embodiments, hypervisor 1060 may control processor scheduling and memory partitioning for virtual machines 1070 executing on virtualization server 1010. Examples of hypervisor 1060 may include those manufactured by VMWare, Inc., of Palo Alto, Calif.; Xen Project® hypervisor, an open-source product whose development is overseen by the open source XenProject.org community; Hyper-V®, Virtual Server®, and Virtual PC® hypervisors provided by Microsoft Corporation of Redmond, Wash.; or others. In some embodiments, virtualization server 1010 may execute hypervisor 1060 that creates a virtual machine platform on which guest operating systems 1090 may execute. In these embodiments, virtualization server 1010 may be referred to as a host server. An example of such a virtualization server is Citrix Hypervisor® provided by Citrix Systems, Inc., of Fort Lauderdale, Fla.

Hypervisor 1060 may create one or more virtual machines 1070 in which guest operating systems 1090 execute. In some embodiments, hypervisor 1060 may load a virtual machine image to create virtual machine 1070. The virtual machine image may refer to a collection of data, states, instructions, etc. that make up an instance of a virtual machine. In other embodiments, hypervisor 1060 may execute guest operating system 1090 within virtual machine 1070. In still other embodiments, virtual machine 1070 may execute guest operating system 1090.

In addition to creating virtual machines 1070, hypervisor 1060 may control the execution of at least one virtual machine 1070. In other embodiments, hypervisor 1060 may present at least one virtual machine 1070 with an abstraction of at least one hardware resource provided by virtualization server 1010 (e.g., any hardware resource available within hardware layer 1010). In other embodiments, hypervisor 1060 may control the manner in which virtual machines 1070 access physical processors 1026 available in virtualization server 1010. Controlling access to physical processors 1026 may include determining whether virtual machine 1070 should have access to processor 1026, and how physical processor capabilities are presented to virtual machine 1070.

As shown in FIG. 10, virtualization server 1010 may host or execute one or more virtual machines 1070. Virtual machine 1070 may be a set of executable instructions and/or user data that, when executed by processor 1026, may imitate the operation of a physical computer such that virtual machine 1070 can execute programs and processes much like a physical computing device. While FIG. 10 illustrates an embodiment where virtualization server 1010 hosts three virtual machines 1070, in other embodiments virtualization server 1010 may host any number of virtual machines 1070. Hypervisor 1060, in some embodiments, may provide each virtual machine 1070 with a unique virtual view of the physical hardware, including memory 1028, processor 1026, and other system resources 1022, 1024 available to that virtual machine 1070. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 1060 may create one or more unsecure virtual machines 1070 and one or more secure virtual machines 1070. Unsecure virtual machines 1070 may be prevented from accessing resources, hardware, memory locations, and programs that secure virtual machines 1070 may be permitted to access. In other embodiments, hypervisor 1010 may provide each virtual machine 1070 with a substantially similar virtual view of the physical hardware, memory, processor, and other system resources available to virtual machines 1070.

Each virtual machine 1070 may include a respective virtual disk 1072 and respective virtual processor 1074. Virtual disk 1072, in some embodiments, may be a virtualized view of one or more physical disks 1022 of virtualization server 1010, or a portion of one or more physical disks 1022 of virtualization server 1010. The virtualized view of physical disks 1022 may be generated, provided, and managed by hypervisor 1060. In some embodiments, hypervisor 1060 may provide each virtual machine 1070 with a unique view of physical disks 1022. Thus, in these embodiments, particular virtual disk 1022 included in each virtual machine 1070 may be unique when compared with other virtual disks 1072.

Virtual processor 1074 may be a virtualized view of one or more physical processors 1026 of virtualization server 1010. In some embodiments, the virtualized view of physical processors 1026 may be generated, provided, and managed by hypervisor 1060. In some embodiments, virtual processor 1074 may have substantially all of the same characteristics of at least one physical processor 1026. In other embodiments, virtual processor 1074 may provide a modified view of physical processors 1026 such that at least some of the characteristics of virtual processor 1074 are different from the characteristics of the corresponding physical processor 1026.

It should be understood that the computer device 1000 operating as the virtualization server 1010 may be configured to provide electronic signature services as a cloud service. Along these lines, various users involved in preparing and/or electronically signing a document are able to access the cloud service.

Figure 11:
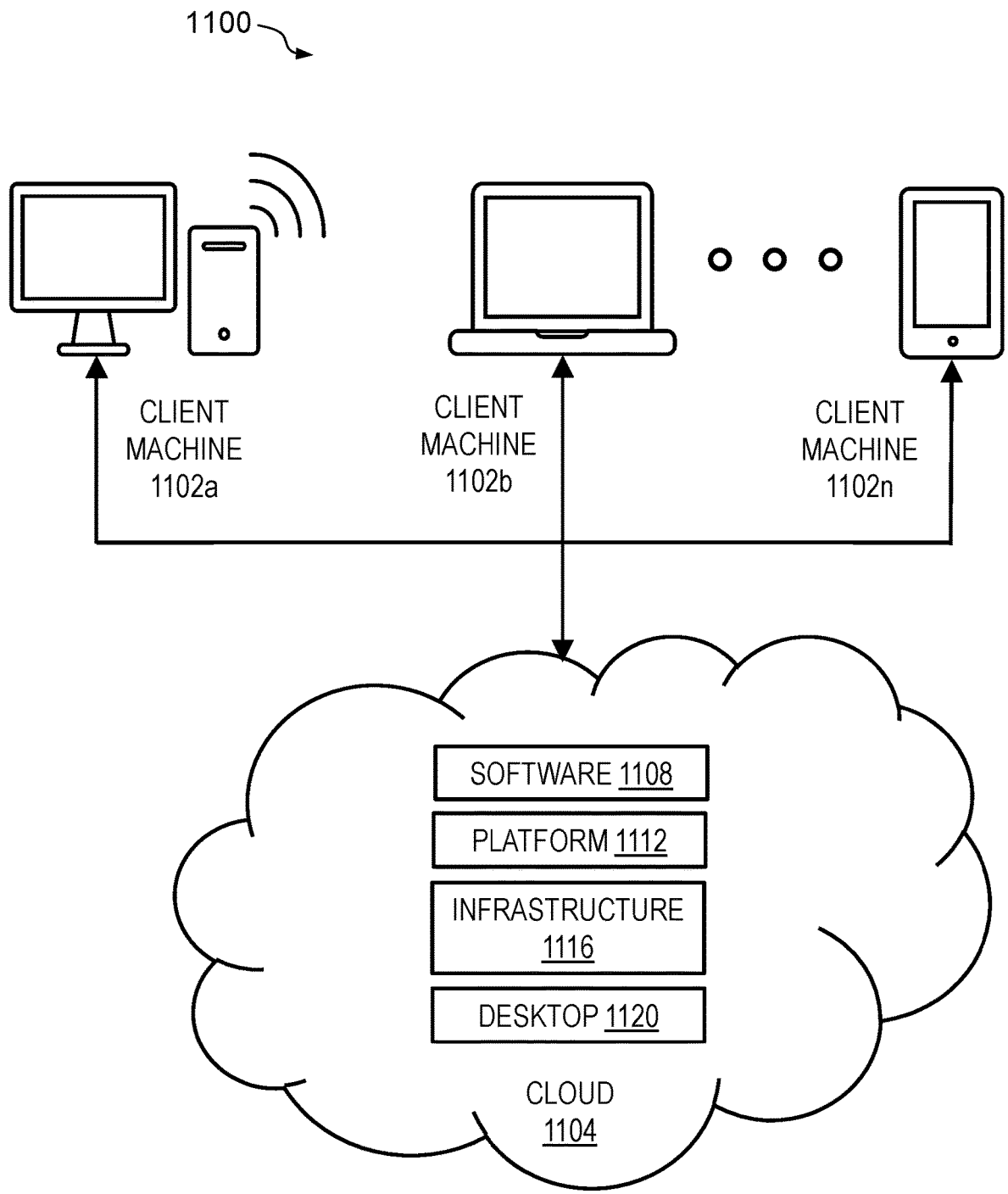
FIG. 11 is a schematic block diagram of a cloud computing environment in which various aspects of the disclosure may be implemented.

Referring now to FIG. 11, a cloud computing environment 1100 is depicted, which may also be referred to as a cloud environment, cloud computing or cloud network. The cloud computing environment 1100 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 1100, one or more clients (or user devices) 1102a-1102n (such as those described above) are in communication with a cloud network 1104. The cloud network 1104 may include back-end platforms, e.g., servers, storage, server farms or data centers. The users or clients 1102a-1102n can correspond to a single organization/tenant or multiple organizations/tenants. More particularly, in one example implementation the cloud computing environment 1100 may provide a private cloud serving a single organization (e.g., enterprise cloud). In another example, the cloud computing environment 1100 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 1100 may provide a hybrid cloud that is a combination of a public cloud and a private cloud. Public clouds may include public servers that are maintained by third parties to the clients 1102a-1102n or the enterprise/tenant. The servers may be located off-site in remote geographical locations or otherwise.

The cloud computing environment 1100 can provide resource pooling to serve multiple users via clients 1102a-1102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 1100 can provide on-demand self-service to unilaterally provision computing capabilities (e.g., server time, network storage) across a network for multiple clients 1102a-1102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 1100 can provide an elasticity to dynamically scale out or scale in response to different demands from one or more clients 1102. In some embodiments, the cloud computing environment 1100 can include or provide monitoring services to monitor, control and/or generate reports corresponding to the provided shared services and resources.

In some embodiments, the cloud computing environment 1100 may provide cloud-based delivery of different types of cloud computing services, such as Software as a service (SaaS) 1108, Platform as a Service (PaaS) 1112, Infrastructure as a Service (IaaS) 1116, and Desktop as a Service (DaaS) 1120, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

An improved technique has been described for distributed electronic signature processing. The technique includes displaying a document for signature on a first device 110 along with an optically-readable code. A second device 120 scans the optically-readable code displayed by the first device 110, initiating a process that transfers signature entry from the first device 110 to the second device 120, which may receive handwritten signatures 122 input or otherwise provided thereon. The second device 120 then accepts the physical signature 122, which is used to effectuate a signing of the document.

Having described certain embodiments, numerous alternative embodiments or variations can be made. For example, the signature-entry field 162 on webpage 160 and the signature-entry field 172 on the webpage containing the document 150 have been described herein as independent fields. As such, the procedure for transferring a user signature 122 from field 162 to field 172 involves sending signature data 164 from the second device 120 to the document server 140 (or workflow server 210), which forwards such signature data 164 to the first device 110. This is merely an example, however. Alternatively, the signature-entry fields 162 and 172 may both point to a distributed, real-time, collaborative field. Examples of fields of this kind may be found in the open-source Fluid Framework, available from Microsoft Corporation of Redmond, Wash. Pointing the signature-entry fields 162 and 172 to a distributed, real-time, collaborative field means that data input into the field 162 on the second device 120 becomes available in real time in the field 172 on the first device 110. Such collaborative fields achieve the same results as described above, e.g., in operations 188, 190, and 192 of FIG. 1 or operations 264, 266, and 268 of FIG. 2, but with a reduced burden on software developers.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 970 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method, comprising:
scanning, by a second device, an optically-readable code displayed by a first device that presents a document for signature;
receiving, by the second device responsive to scanning of the optically-readable code, a webpage that includes a signature-entry field; and
in response to the second device receiving a physical signature, entering the physical signature into the document to sign the document,
wherein the method further comprises:
monitoring, by the first device, the document for data entry into fields of the document;
detecting a user selection of a signature field of the document; and
performing an operation configured to (i) continue completion of data entry into the document by the first device responsive to said monitoring indicating data entry into a at least one field of the document prior to detecting the user selection and (ii) hand off completion of data entry into the document to the second device responsive to said monitoring indicating no data entry into any field of the document prior to the user selection.

2. The method of claim 1, wherein the optically-readable code includes a URL (uniform resource locator) of the webpage that includes the signature-entry field, and wherein receiving the webpage includes downloading, by the second device, the webpage from a location specified by the URL.

3. The method of claim 2, further comprising:
generating, by the second device, signature data that represents a manual input of the signature; and
transferring, by the second device, the signature data to the first device to enable the first device to incorporate the signature into the document based on the signature data received from the second device.

4. The method of claim 2, further comprising:
generating, by the second device, signature data that represents a manual input of the signature; and
transferring, by the second device, the signature data to a server.

5. The method of claim 2, wherein the URL provides a location of the document, and wherein receiving the webpage includes downloading, by the second device, the document from the location specified by the URL.

6. The method of claim 5, wherein entering the physical signature into the document includes entering the signature into the document on the second device.

7. The method of claim 1, wherein the optically-readable code is a QR (quick response) code.

8. The method of claim 1, further comprising the second device receiving the physical signature via a touchscreen.

9. A method, comprising:
displaying, by a first device, a document for signature and an optically-readable code, the optically-readable code providing a location of a webpage that includes a signature field associated with the document;
receiving, by the first device, signature data that represents a physical signature entered into the signature field of the webpage on a second device; and incorporating, by the first device, the signature data into the document based on the signature data received from the second device, wherein the method further comprises:
- monitoring, by the first device, the document for data entry into fields of the document;
- detecting a user selection of a signature field of the document; and
- performing an operation configured to (i) continue completion of data entry into the document by the first device responsive to said monitoring indicating data entry into a at least one field of the document prior to detecting the user selection and (ii) hand off completion of data entry into the document to the second device responsive to said monitoring indicating no data entry into any field of the document prior to the user selection.

10. The method of claim 9, wherein displaying the optically-readable code is responsive to detecting, by the first device, a user-selection of a signature field of the document.

11. The method of claim 10, further comprising:
- prior to detecting the user-selection of the signature field, identifying entry of user input into a non-signature field of the document; and
- selectively providing, responsive to the identification, the optically-readable code as one or (i) a URL of a webpage that includes a signature-entry field but not the document itself or (ii) a URL of the document.

12. The method of claim 9, wherein displaying the optically-readable code includes rendering the optically-readable code within at least one of (i) a window that displays the document and (ii) a window separate from the document.

13. The method of claim 9, wherein displaying the document for signature includes rendering the document within a second webpage, and wherein displaying the optically-readable code includes rendering the optically-readable code within an HTML element of the second webpage.

14. A method, comprising:
- transmitting, by a server, a document for signature and an optically-readable code to a first device of a user, the optically-readable code configured to provide a location of a webpage that includes a signature-entry field associated with the document; and
- in response to the server receiving, from a second device of the user, a request to download the webpage, sending the webpage to the second device, the webpage enabling entry of a physical signature of the user into the signature-entry field associated with the document, wherein the method further comprises:
- monitoring, by the first device, the document for data entry into fields of the document;
- detecting a user selection of a signature field of the document; and
- performing an operation configured to (i) continue completion of data entry into the document by the first device responsive to said monitoring indicating data entry into a at least one field of the document prior to detecting the user selection and (ii) hand off completion of data entry into the document to the second device responsive to said monitoring indicating no data entry into any field of the document prior to the user selection.

15. The method of claim 14, wherein transmitting the document and the optically-readable code to the first device includes incorporating the optically-readable code into the document prior to transmitting the document to the first device.

16. The method of claim 14, wherein transmitting the document and the optically-readable code to the first device includes:
- sending the document to the first device without the optically-readable code; and
- in response the server receiving an indication from the first device that an event has occurred, sending the optically-readable code to the first device.

17. The method of claim 14, further comprising:
- generating the webpage as one that includes the signature-entry field associated with the document but not the document itself; and
- generating a URL (uniform resource locator) that identifies the webpage.

18. The method of claim 14, wherein the optically-readable code provides a URL of the document.

19. The method of claim 14, further comprising, prior to transmitting the document to be signed to the first device:
- receiving the document from a document-signing service;
- determining whether the document includes a signature field; and
- responsive to the determination, inserting into the document one of (i) the optically-readable code and (ii) a placeholder for later receiving the optically-readable code.

20. The method of claim 19, wherein transmitting the optically-readable code to the first device includes providing the optically-readable code for incorporation into the document at the placeholder.

21. The method of claim 19, further comprising analyzing the document to determine whether it includes a signature-entry field.

22. The method of claim 21, wherein analyzing the document includes searching the document for DOM (Document Object Model) elements that resemble signature-entry fields.

\* \* \* \* \*